(12) United States Patent
Franzen et al.

(10) Patent No.: US 7,077,881 B2
(45) Date of Patent: Jul. 18, 2006

(54) APPARATUS FOR SIMULTANEOUS CLEANING OF A LIQUID AND A GAS

(75) Inventors: Peter Franzen, Tullinge (SE); Torgny Lagerstedt, Stockholm (SE)

(73) Assignee: Alfa Laval Corporate AB, Lund (SE)

( * ) Notice: Subject to any disclaimer, the term of this patent is extended or adjusted under 35 U.S.C. 154(b) by 0 days.

(21) Appl. No.: 10/502,270

(22) PCT Filed: Dec. 19, 2002

(86) PCT No.: PCT/SE02/02401

§ 371 (c)(1),
(2), (4) Date: Apr. 15, 2005

(87) PCT Pub. No.: WO03/061838

PCT Pub. Date: Jul. 31, 2003

(65) Prior Publication Data

US 2005/0198932 A1    Sep. 15, 2005

(30) Foreign Application Priority Data

Jan. 25, 2002    (SE) .................................. 0200204

(51) Int. Cl.
  *B04B 5/12* (2006.01)
  *F01M 12/04* (2006.01)
  *B01D 45/12* (2006.01)
(52) U.S. Cl. .......................... 55/401; 55/406; 55/521; 55/DIG. 19; 210/512.1
(58) Field of Classification Search ................ 55/400, 55/401, 403, 406, 421, DIG. 19; 95/270; 210/168, 512.1; 123/198 E; 494/56, 70
See application file for complete search history.

(56) References Cited

U.S. PATENT DOCUMENTS

| 4,478,718 A * | 10/1984 | Saget ....................... 210/512.3 |
| 4,840,645 A * | 6/1989 | Woodworth et al. .......... 95/270 |
| 5,092,912 A * | 3/1992 | Korman ....................... 95/197 |
| 5,637,217 A * | 6/1997 | Herman et al. .......... 210/380.1 |
| 6,821,319 B1 * | 11/2004 | Moberg et al. ................ 95/270 |
| 2004/0107681 A1 * | 6/2004 | Carlsson et al. .............. 55/406 |
| 2005/0198932 A1 * | 9/2005 | Franzen et al. ............... 55/406 |

FOREIGN PATENT DOCUMENTS

| DE | 199 14 166 A1 | 10/2000 |
| EP | 1 217 183 A1 | 11/2001 |
| WO | WO 99/56883 | 11/1999 |

* cited by examiner

*Primary Examiner*—Frank M. Lawrence
(74) *Attorney, Agent, or Firm*—Michaud-Duffy Group LLP

(57) ABSTRACT

In an apparatus for simultaneous cleaning of a liquid and a gas a centrifugal rotor for cleaning of the liquid is connected with a device for cleaning of the gas. The centrifugal rotor is contained in a stationary housing, and this housing delimits a supply passage for gas to be cleaned and on its way to the cleaning device. The gas cleaning device comprises a stack of conical separation discs surrounding a gas inlet chamber and surrounded by a receiving chamber that is delimited by a surrounding stationary casing.

8 Claims, 1 Drawing Sheet

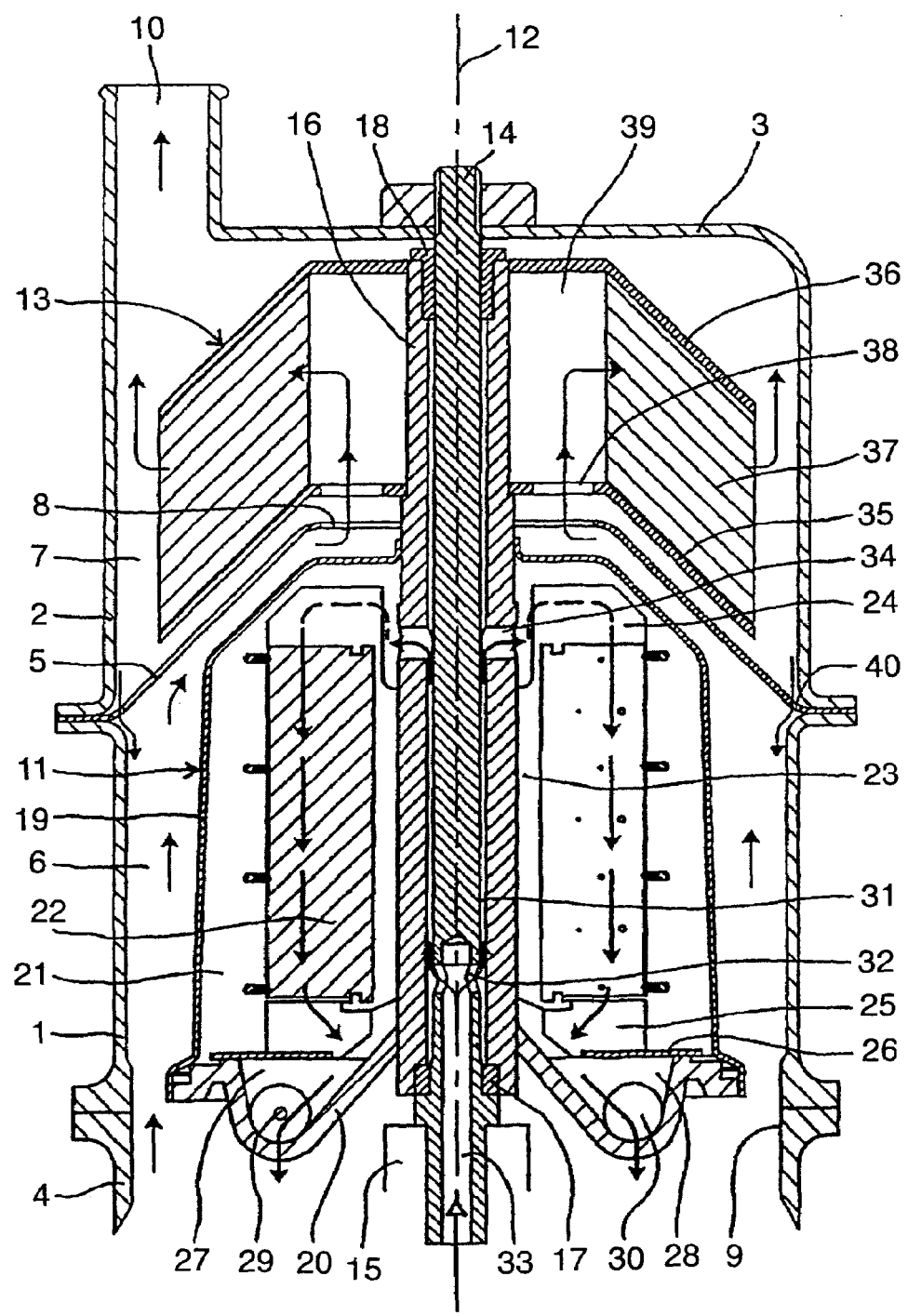

APPARATUS FOR SIMULTANEOUS CLEANING OF A LIQUID AND A GAS

CROSS-REFERENCE TO RELATED APPLICATIONS

This application is entitled to the benefit of and incorporates by reference essential subject matter disclosed in International Application No. PCT/SE02/02401 filed on Dec. 19, 2002 and Swedish Patent Application No. 0200204-6 filed on Jan. 25, 2002.

FIELD OF THE INVENTION

The present invention relates to an apparatus for the simultaneous cleaning of a liquid from first particles suspended therein and a gas from second particles suspended therein, in which apparatus a centrifugal rotor is rotatable about a rotational axis and arranged for through flow and cleaning of said liquid, a driving device is arranged for rotation of the centrifugal rotor about said rotational axis, a gas cleaning device is connected with the centrifugal rotor for rotation together therewith and is arranged for through flow and cleaning of said gas, a stationary housing surrounds the centrifugal rotor and delimits a passage for conducting said gay to a gas inlet of the gas cleaning device and the gas cleaning device includes a stack of conical separation discs, which are arranged coaxially with said rotational axis and between themselves delimit flow passages for the gas to be cleaned.

BACKGROUND OF THE INVENTION

WO 99/56883 shows (in FIG. 5) and describes an apparatus of this kind, in which the gas cleaning device includes first a number of conical separation discs rotatable with the centrifugal rotor and second a number of stationary conical separation discs. The stationary separation discs are arranged between the rotatable separation discs. The gas cleaning device further comprises a housing rotatable with said centrifugal rotor, said housing being provided with a gas inlet for the gas to be cleaned and supporting on its inside the rotatable separation discs, and a stationary central tube forming a gas outlet for cleaned gas and supporting on its outside the aforementioned stationary separation discs. A gas cleaning device designed in this way is relatively expensive to manufacture and, moreover, it requires a certain overpressure of the gas to be cleaned, to enable the gas to flow through the gas cleaning device.

WO 99/56883 also shows (in FIG. 7) an alternative embodiment of a gas cleaning device having conical separation discs. Also this gas cleaning device is relatively expensive to manufacture. Furthermore, a separate gas supply device is required, since the housing surrounding the centrifugal rotor for the cleaning of liquid, in this case, does not delimit any gas supply passage leading to the gas cleaning device.

The object of the present invention is to provide an apparatus for simultaneous cleaning of both a liquid and a gas, said apparatus being compact and relatively inexpensive to manufacture and, moreover, enabling cleaning of gas without the gas being subjected to a pressure drop on its passage through the gas cleaning device.

SUMMARY OF THE INVENTION

According to the invention, this object may be obtained by an apparatus of the initially defined kind, which is characterized in that the stack of separation discs delimits a central space in communication on one hand with said passage in the stationary housing, through the inlet of the gas cleaning device, and on the other hand with radially inner parts of the flow passages between the conical discs, and that the stack of separation discs is surrounded by a stationary casing delimiting around the separation discs a receiving space, in which radial outer parts of the flow passages between the conical discs open.

An apparatus constructed in this way becomes inexpensive to manufacture, since essentially the whole rotatable gas cleaning device may be constituted by a stack of conical separation discs supported by one and the same support device, which in turn is supported by said centrifugal rotor. Furthermore, the gas cleaning device during operation will actively pump the gas to be cleaned through the gas cleaning device, instead of creating a flow resistance for the gas. The apparatus in its entirety may be made very compact due to the fact that the stationary housing surrounding the centrifugal rotor is used to form a supply passage for the gas to be cleaned.

To become as compact as possible the apparatus is preferably designed such that the stationary housing around the centrifugal rotor and the stationary casing around the stack of separation discs are formed of a common house. Then, if desired, a supply channel for gas to be cleaned may be formed completely separate in said house, the gas inlet to the gas cleaning device being situated at any end of the gas cleaning device. For instance, the stationary housing around the centrifugal rotor—and possibly even the stationary casing around the gas cleaning device—may have two surrounding walls, which between themselves delimit said supply channel. However, it is preferred that said gas inlet is situated at the end of the gas cleaning device, facing the centrifugal rotor, and that the supply channel for gas to be cleaned is formed by a space surrounding the centrifugal rotor and formed between this and the stationary housing. Of course, a space of this kind may constitute a part of the supply passage for gas to be cleaned, a separate channel being formed in the casing around the separation discs and being arranged to conduct the gas further to said gas inlet independent of at which end of the gas cleaning device the gas inlet is situated.

In the case the gas inlet is facing the centrifugal rotor and a common house surrounds the centrifugal rotor as well as the separation discs, preferably an annular partition is arranged between the centrifugal rotor and the gas cleaning device for conducting tho gas to be cleaned from the aforementioned space around the centrifugal rotor radially inwards to the gas inlet of the gas cleaning device.

For practical reasons and for obtaining the best possible balance of the rotatable parts of the apparatus, the apparatus advantageously is arranged so that said rotational axis extends vertically, the gas cleaning device preferably being placed above the centrifugal rotor. An arrangement of this kind is especially suitable in the case the centrifugal rotor is reaction driven by means of pressurized liquid, i.e. when the centrifugal rotor has a centrally situated inlet for such liquid and at least one liquid outlet spaced from the rotational axis and directed tangentially to accomplish a reaction drive of the centrifugal rotor. However, any suitable driving device may be used for the rotation of the centrifugal rotor. Thus, it may be driven by means of an electrical, hydraulical or prieumatical motor. Advantageously it may be driven by means of a so-called Pelton-turbine.

An apparatus according to the present invention is especially suitable for use with a combustion engine for cleaning of both the lubricating oil of the engine, which is circulated inside the engine, and crankcase gas leaving the engine at a relatively low overpressure.

BRIEF DESCRIPTION OF THE DRAWING

The invention is described in the following with reference to the accompanying drawing, which shows a longitudinal section through an apparatus for simultaneous cleaning of a liquid and a gas, e.g. lubricating oil and crankcase gas.

DETAILED DESCRIPTION OF THE PREFERRED EMBODIMENTS

The apparatus in the drawing comprises a stationary house consisting of a housing 1, which is essentially cylindrical, and on top thereof a casing 2, which also is essentially cylindrical and which at the top has an end wall 3. The house 1, 2 rests on a foundation 4.

A frusto-conical partition 5 is fixedly arranged between the housing I and the casing 2 and divides the interior of the house into a lower chamber 6 and an upper chamber 7. The partition 5 has a central through opening 8. Gas to be cleaned may be conducted into the lower chamber 6 through an opening 9 in the foundation 4, and cleaned gas may leave the upper chamber 7 through an outlet opening 10 in the end wall 3 of the casing 2.

A centrifugal rotor 11 for cleaning of said liquid is arranged in the lower chamber 6 and is rotatable around a vertical axis 12. The centrifugal rotor 11 supports, on its upper side, a gas cleaning device 13 for cleaning of said gas. The gas cleaning device is situated in the upper chamber 7 and is arranged to rotate together with the centrifugal rotor 11.

The main parts of the centrifugal rotor II will be described below, but for a more detailed description of the centrifugal rotor reference is made to WO 99/51353. Therein, a substantially similarly designed centrifugal rotor is described and shown (see especially FIGS. 3–5). Thus, the detailed configuration of the centrifugal rotor 11 constitutes no part of the present invention.

A stationary shaft 14 extends vertically and centrally through the entire house 1, 2. The shaft 14 is at its lower end connected with a diagrammatically shown stationary member 15 and is at its upper end connected with said end wall 3. The shaft 14 is surrounded by a tubular supporting member 16, which extends through both of the chambers 6 and 7 and is journalled on the shaft 14 through a lower bearing 17 and an upper bearing 18. In the lower chamber 6 the member 16 supports said centrifugal rotor 11, and in the same way the member 16 supports said cleaning device 13 in the upper chamber 7.

The centrifugal rotor 11 comprises a casing 19 and an end wall 20, which together delimit a separation chamber 21. Both the casing 19 and the end wall 20 are connected with the tubular member 16 in a way so that they may rotate together therewith retative to the central shaft 14. A ring of separation discs 22 is arranged around the member 16 within the separation chamber 21. Every separation disc 22 extends both axially and radially relative to the rotational axis 12. Preferably, the disc extends arcuately from a first to a second distance from the rotational axis 12 (see FIG. 5 in WO 99/51353). Axial flow channels are formed between the separation discs 22, evenly distributed around the rotational axis 12.

The separation discs 22 are connected with the tubular member 16 by means of an only diagrammatically shown supporting device 23. The supporting device 23 comprises a number of radially extending wings 24 situated above the separation discs 22 and evenly distributed around the rotational axis 12.

Below the separation discs a number of wings 25 are arranged in a similar way around the rotational axis 12. The wings 25 may extend either radially or arcuately from their radially innermost to their radially outermost edges. The wings 25 are supported by an essentially plane, annular partition 26, which in turn is supported at its radially outermost part by the end wall 20 of the centrifugal rotor.

The end wall 20 is formed with two recesses situated diametrically on each side of the rotational axis 12 and forming between the end wall 20 and the partition 26 two outlet chambers 27 and 28 for liquid having been cleaned in the centrifugal rotor. These outlet chambers communicate with the separation chamber 21 through passages formed between a central part of the end wall 20 and the radially innermost part of the partition 26. Each of the outlet chambers 27 and 28 communicates with a liquid outlet 29 and 30, respectively (merely indicated by a dashed circular line), which extends through the end wall 20 at a distance from the rotational axis 12 and is directed tangentially relative to the rotational axis.

Between the stationary central shaft 14 and the rotatable tubular supporting member 16 there is formed an annular channel 31. At its lower end this channel 31 communicates, through holes 32 in the central shaft 14, with a central inlet channel 33 in the lower part of the central shaft. The inlet channel 33, in turn, communicates with a source of pressurized liquid to be cleaned in the centrifugal rotor. At its upper end the annular channel 31 communicates, through holes 34 in the tubular member 16, with the upper part of the separation chamber 21.

The gas cleaning device 13 in the upper chamber 7 comprises a lower conical end wall 35 and an upper conical end wall 36. Between these end walls 35 and 36 there is arranged a stack of frusto-conical separation discs 37, which between themselves delimit flow passages for gas to be cleaned therein. The end walls 35 and 36 as well as the separation discs 37 are connected with the tubular member 16 in a way so that they are rotatable together therewith.

In a central part, the lower end wall 35 has a number of through holes 38 distributed around the rotational axis 12, whereas the upper end wall 36 has no such holes. Centrally in the stack of separation discs 37 a space is delimited between the end walls, forming an inlet chamber 39 for gas to be cleaned. This inlet chamber may be formed, alternatively, by all of the separation discs in their central parts having through holes similar to the holes 38 in the lower end wall 35. The inlet chamber 39 communicates both with the aforementioned central opening 8 in the conical partition 5, through the openings 38 in the lower end wall 35, and with the chamber 7, in which the cleaning device 13 is situated, through said flow passages between the separation discs 37.

In the cleaning device 13 the separation discs 37 are kept at a distance from each other by means of elongated spacing members (not shown), which between themselves delimit the aforementioned flow passages. Such spacing members may be completely straight and extend either radially or form an angle with radii starting from the rotational axis 12. Alternatively, the spacing members may have a curved or some other suitable shape. A closer description of a cleaning device of the kind here in question can be found in WO 01/36103.

The aforementioned conical partition 5 has a plurality of small through holes 40 at its radially outermost part, evenly distributed around the rotational axis 12.

The above described cleaning device operates as follows when used for cleaning of lubricating oil, circulating under pressure in a combustion engine, and for cleaning of crankcase gas leaving the same combustion engine.

Lubricating oil to be (cleaned from solid particles, such as soot and possible metal particles, is supplied with an overpressure into the separation chamber 21 of the centrifugal rotor II through the inlet channels 33 and 31. As illustrated by means of arrows in the drawing, the lubricating oil flows further substantially axially downwardly in the spaces between the separation discs 22 and further to the two outlet chambers 27 and 28. The pressurized lubricating oil leaves the centrifugal rotor through the tangentially directed outlets 29 and 30, whereby a reaction force arises causing the centrifugal rotor to rotate around the rotational axis 12.

Lubricating oil entering the upper part of the separation chamber 21 through the openings 34 is brought into rotation by means of the wings 24 rotating with the centrifugal rotor. During its through flow of the spaces between the separation discs 22 the lubricating oil is freed from particles suspended therein, which deposit onto the separation discs and then slide thereon radially outwards. When the particles have reached the outer edges of the separation discs 22 they are thrown radially outwards and deposit onto the inside of the rotor casing 11.

The lubricating oil freed from particles continues downwards between the separation discs and leaves the centrifugal rotor through the outlet openings 29 and 30, as earlier described. The (leaned lubricating oil is returned to the combustion engine through the opening 9 in the foundation 4.

Entering the cleaning device through the same opening 9 in the foundation 4 is crankcase gas to be cleaned from a mist of lubricating oil and possible accompanying solid particles. The contaminated crankcase gas firstly flows upwards through the chamber 6 between the centrifugal rotor II and the stationary housing I and is then conducted towards and through the central opening 8 in the conical partition 5. The housing I for the centfifugal rotor 11 thus delimits a supply passage (6), leading to the gas cleaning device, for gas to be cleaned.

The main part of the crankcase gas is then conducted into the central inlet camber 39 in the gas cleaning device 13 and from there further through the flow passages between the separation discs 37. In these flow passages the crankcase gas is brought into rotation, particles suspended therein being deposited onto the separation discs 37. Separated liquid particles coalesce to a liquid, i.e. lubricating oil in this case, which as a consequence of centrifugal forces flows on the separation discs to their radially outer edges. The lubricating oil is thrown therefrom out in the chamber 7 and deposit on the inside of the casing 2 surrounding the cleaning device 13. The lubricating oil runs downwards on the casing 2 and through the holes 40 in the partition 5 into the chamber 6. Herein the lubricating oil runs further downwards on the inside of the housing 1 and is conducted through the opening 9 in the foundation 4 back to the combustion engine.

The cleaned crankcase gas flows out of the chamber 7 through the outlet 10 and may, if desired, be returned to the combustion engine through its air intake or be conducted to the surrounding atmosphere.

Due to the fact that the crankcase gas is brought into rotation between the separation discs 37, the rotating cleaning device will operate as a fan creating an underpressure at the central opening 8 in the partition 5. Crankcase gas will thus be sucked upwards through the chamber 6 around the centrifugal rotor 11 and does not have to be supplied to the cleaning device 13 with an overpressure.

However, this requires that the interspace between the rotating lower end wall 35 of the cleaning device 13 and the stationary partition 5 is not too large. By proper dimensioning of this interspace conditions may be created for a minimum of flow of crankcase gas between the cleaning device 13 and the partition 5.

Possibly, a sealing means, e.g. a labyrinth seal, may be arranged between the stationary partition 5 and the rotatable lower end wall 35, which is not desirable, though.

In the embodiment of the invention described above gas to be cleaned is conducted in direct contact with the outside of the centrifugal rotor 11 on its way to the cleaning device 13. Alternatively a separate passage may be formed in or through the housing I for the gas to be cleaned. Thus, for instance, the surrounding wall of the housing 1 and the stationary partition 5 may be made double-walled, so that a flow passage is formed between the walls. It is also possible to arrange a separate passage of this kind only at a part or at certain parts of the circumference of the housing 1.

In the described embodiment of the invention the centrifugal rotor 11, further, is arranged to be driven by means of reaction force from pressurized liquid released from the centrifugal rotor through tangentially directed outlets 29 and 30. Alternatively, any suitable driving device may be used to drive the centrifugal rotor and, thereby, the cleaning device 13.

What is claimed is:

1. An apparatus for the simultaneous cleaning of a liquid from first particles suspended therein and a gas from second particles suspended therein, the apparatus comprising:
    a centrifugal rotor rotatable about a rotational axis and arranged for through flow and cleaning of said liquid,
    a driving device is arranged for rotation of the centrifugal rotor about said rotational axis,
    a gas cleaning device connected with the centrifugal rotor for rotation together therewith and arranged for through flow and cleaning of said gas,
    a stationary housing surrounding the centrifugal rotor and delimiting a passage for conducting said gas to a gas inlet of the gas cleaning device,
    the gas cleaning device including a stack of conical separation discs arranged substantially coaxially with said rotational axis and between themselves delimiting flow passages for the gas to be cleaned,
    the stack of separation discs delimiting a central space in communication with said passage in the stationary housing, through the inlet of the gas cleaning device, and also with radially inner parts of the flow passages between the conical discs, and wherein
    the stack of separation discs is surrounded by a stationary casing delimiting around the separation discs a receiving space, in which radial outer parts of the flow passages between the conical discs open.

2. An apparatus according to claim 1, wherein the stationary housing, surrounding the centrifugal rotor, and the stationary casing, surrounding the stack of separation discs, are formed of a common housing.

3. An apparatus according to claim 1, wherein the gas cleaning device is situated at one axial end of the centrifugal rotor and said gas inlet is situated at the end of the gas cleaning device facing the centrifugal rotor.

4. An apparatus according to claim 3, wherein said passage is constituted by a space surrounding the centrifugal rotor and formed between this and the stationary housing.

5. An apparatus according to claim 4, wherein an annular partition is arranged between the centrifugal rotor and the gas cleaning device and is arranged to conduct gas to be cleaned from the space towards the gas inlet of the gas cleaning device.

6. An apparatus according to claim 1, wherein said rotational axis extends substantially vertically and the gas cleaning device is placed above the centrifugal rotor.

7. An apparatus according to claim 1, wherein the centrifugal rotor has a central inlet for a pressurized liquid and at least one liquid outlet spaced from said rotational axis and directed tangentially to accomplish a reaction drive of the centrifugal rotor.

8. An apparatus according to claim 1, wherein a space that contains lubricating oil coming from a combustion engine is in communication with an inlet defined by said apparatus, and a space that contains crankcase gas coming from said combustion engine is also in communication with an inlet defined by said apparatus.

* * * * *